(12) United States Patent
Guinart et al.

(10) Patent No.: US 9,632,106 B2
(45) Date of Patent: Apr. 25, 2017

(54) METHOD FOR DETERMINING THE ANGULAR POSITION OF AN ELECTRONIC MODULE FIXED TO THE INNER FACE OF THE TREAD OF A TIRE

(71) Applicants: CONTINENTAL AUTOMOTIVE FRANCE, Toulouse (FR); CONTINENTAL AUTOMOTIVE GmbH, Hannover (DE)

(72) Inventors: Nicolas Guinart, Toulouse (FR); Jean-Philippe Boisset, Montauban (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 234 days.

(21) Appl. No.: 13/936,433

(22) Filed: Jul. 8, 2013

(65) Prior Publication Data
US 2014/0007683 A1    Jan. 9, 2014

(30) Foreign Application Priority Data

Jul. 6, 2012   (FR) ..................................... 12 56527

(51) Int. Cl.
*G01P 15/16* (2013.01)
*B60C 23/04* (2006.01)
*B60C 23/06* (2006.01)

(52) U.S. Cl.
CPC ........ *G01P 15/165* (2013.01); *B60C 23/0416* (2013.01); *B60C 23/0459* (2013.01);
(Continued)

(58) Field of Classification Search
CPC ............... G01P 15/165; B60C 23/0416; B60C 23/0459; B60C 23/0489; B60C 23/0493; B60C 23/064
(Continued)

(56) References Cited

U.S. PATENT DOCUMENTS 5,808,190 A   9/1998  Ernst
6,112,587 A   9/2000  Oldenettel
(Continued)

FOREIGN PATENT DOCUMENTS

EP      0806306     11/1997
EP      0895879      2/1999
WO    2012/045917    4/2012

OTHER PUBLICATIONS

French Search Report dated Oct. 31, 2012, corresponding to the Foreign Priority Application No. 12 56527.

*Primary Examiner* — Harshad R Patel
*Assistant Examiner* — David L Singer
(74) *Attorney, Agent, or Firm* — Young & Thompson

(57) ABSTRACT

An angular position is determined for an electronic module fixed to the inner face of the tread of a tire fitted to a wheel of a vehicle. A sensor for measuring the radial acceleration of the wheel is integrated into the electronic module, and a variation of the radial acceleration is detected that corresponds to a position of the electronic module when it contacts the ground. This variation is used to determine a frame of reference defined by an origin and a reference unit corresponding to an angular sector of the tire having a length is shorter than a mean length of the footprint of the grounded tire, in order to determine angular positions of the electronic module in the frame of reference.

12 Claims, 2 Drawing Sheets

(52) U.S. Cl.
CPC ...... *B60C 23/0489* (2013.01); *B60C 23/0493* (2013.01); *B60C 23/064* (2013.01)

(58) Field of Classification Search
USPC ........................................ 73/514.02; 702/141
See application file for complete search history.

(56) References Cited

U.S. PATENT DOCUMENTS

| | | | |
|---|---|---|---|
| 6,538,566 B1* | 3/2003 | Morand | B60C 23/0413 340/442 |
| 2005/0145025 A1* | 7/2005 | Fischer | B60C 23/0416 73/146 |
| 2005/0204806 A1* | 9/2005 | Brusarosco | B60C 23/064 73/146 |
| 2007/0107505 A1* | 5/2007 | Schillinger | B60C 23/0408 73/146 |
| 2008/0015763 A1* | 1/2008 | Kitazaki | B60C 23/064 701/70 |
| 2009/0118891 A1* | 5/2009 | Koguchi | B60C 23/064 701/31.4 |
| 2009/0234591 A1* | 9/2009 | Savaresi | B60T 8/1725 702/41 |
| 2009/0293602 A1 | 12/2009 | Gotschlich | |
| 2010/0057295 A1* | 3/2010 | Pannek | 701/35 |
| 2011/0130919 A1* | 6/2011 | Neuscheler | B60C 23/0408 701/33.4 |
| 2011/0199201 A1 | 8/2011 | Brusarosco | |
| 2012/0116607 A1* | 5/2012 | Guinart | 701/1 |
| 2013/0179113 A1* | 7/2013 | Guinart | 702/141 |
| 2013/0204573 A1* | 8/2013 | Kandler | B60C 23/0488 702/150 |

* cited by examiner

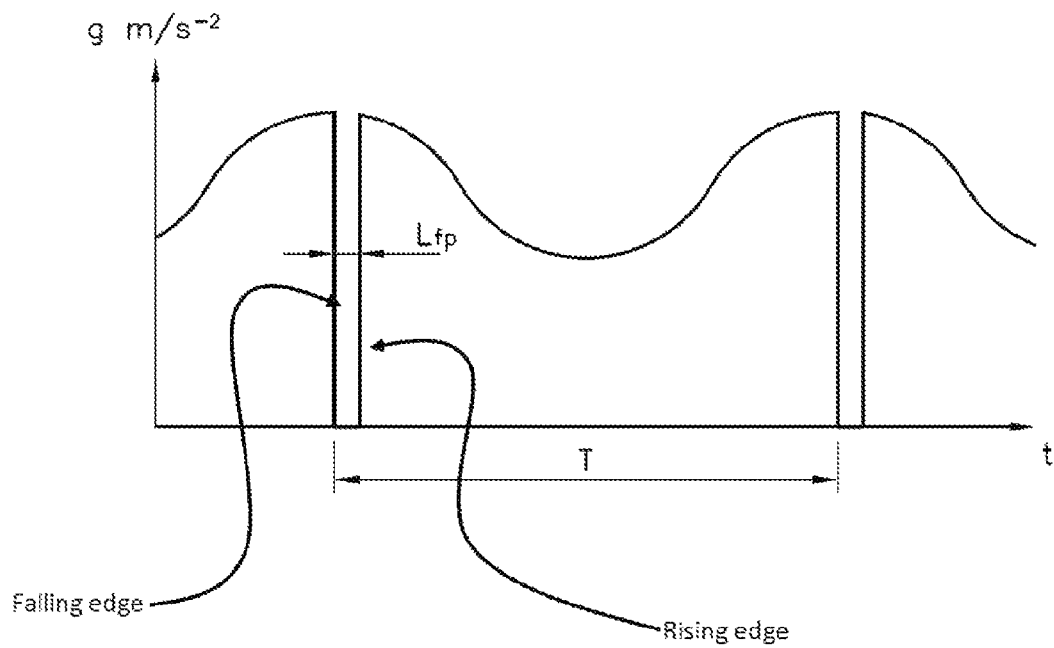
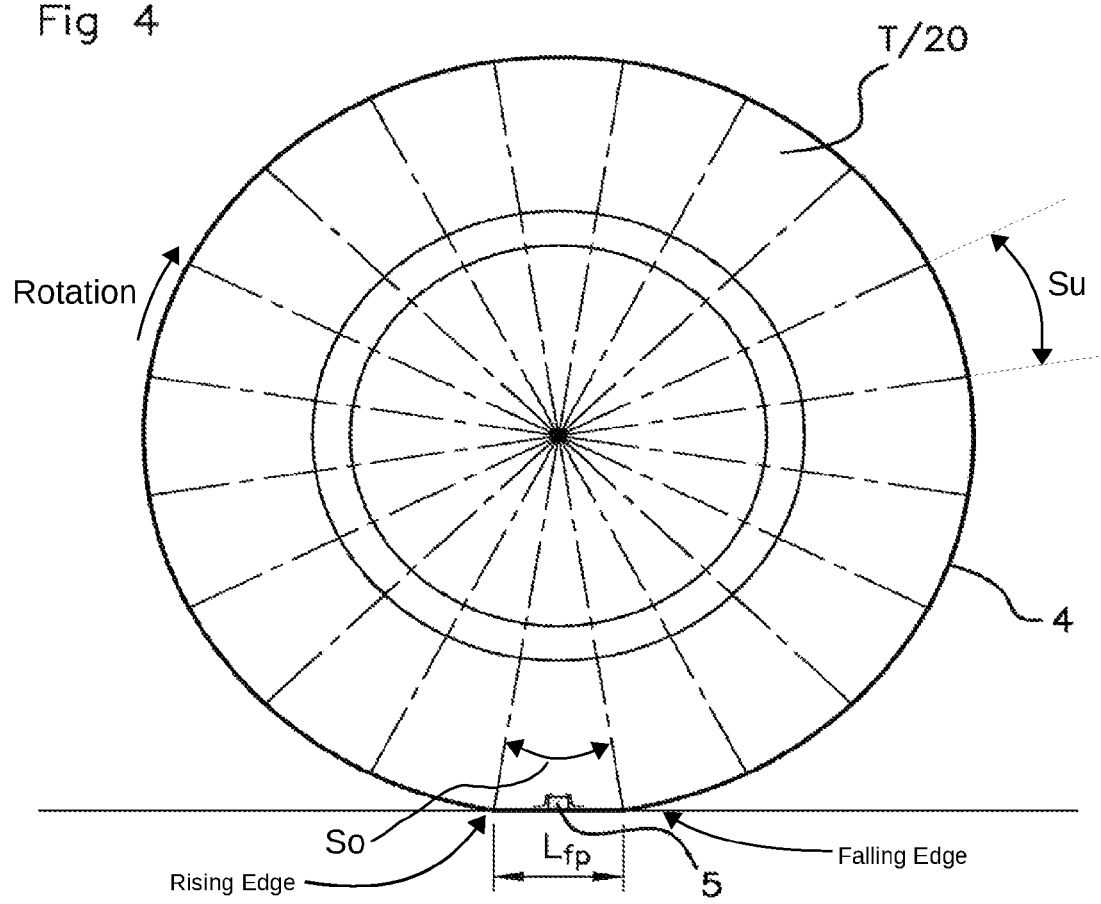

METHOD FOR DETERMINING THE ANGULAR POSITION OF AN ELECTRONIC MODULE FIXED TO THE INNER FACE OF THE TREAD OF A TIRE

The invention relates to a method for determining, during the rotation of a vehicle wheel fitted with a tire, the angular position of an electronic module fixed to the inner face of the tread of said tire.

BACKGROUND OF THE INVENTION

It is increasingly common for motor vehicles to have monitoring systems for safety purposes, these systems having sensors mounted on each of the wheels of the vehicle, used for measuring parameters, such as pressure or temperature, of the tires fitted on these wheels, with the aim of informing the driver of any abnormal variation in the measured parameter.

These monitoring systems conventionally have an electronic module mounted on each wheel of the vehicle, incorporating, in addition to the aforesaid sensors, a microprocessor and a radio frequency transmitter, while the system also has a central unit for receiving the signals sent by the transmitters, including a computer incorporating a radio frequency receiver connected to an antenna.

One of the problems to be resolved by these monitoring systems lies in the requirement for each signal received by the receiver of the central unit to be associated with a data element relating to the location of the electronic module, and consequently the location of the wheel from which this signal originated, this requirement continuing throughout the life of the vehicle; that is to say, it must be met even after wheel changes or, more simply, after reversals of the wheel positions.

Numerous methods are currently proposed for achieving this location of the position of the wheels of a vehicle, including location methods such as those described, notably, in patents EP 0 806 306 and EP 0 895 879, the principle of which is based on the correlation present between the signals delivered by a sensor fitted to a wheel and the signals delivered by a sensor mounted on the vehicle in the proximity of this wheel.

Since most present-day vehicles are fitted with active safety systems such as the ABS anti-lock system for wheels and the ESP system for dynamic stability control, these location methods are, notably, of considerable value in terms of installation cost, since the wheel location is performed by correlating the signals delivered by the sensors of said active safety system with the signals delivered by the sensors normally integrated into the electronic modules of the monitoring system.

Consequently, the application of these location methods simply requires the implementation of software for processing the delivered signals, without the need for additional special hardware.

At present, however, these location methods are restricted to electronic modules mounted on the rims of vehicle wheels.

This is because the problem of signal transmission for fixed angular positions of the electronic modules is fully resolved when the sensors are integrated into electronic modules mounted on the rims of the wheels. On the other hand, the measurement environment is completely different when the electronic module is fixed to the inner face of the tread of a tire: on each revolution, this electronic module comes into contact with the ground and is therefore subjected to an impact which causes the invalidation of the strategy for determining the angular position of said electronic module.

SUMMARY OF THE INVENTION

The present invention is intended to resolve this problem, with the primary object of providing a method for determining the angular position of an electronic module fixed to the inner face of the tread of a tire.

To this end, the invention proposes a method for determining the angular position of an electronic module fixed to the inner face of the tread of a tire, according to which:

a sensor for measuring the radial acceleration of the wheel is integrated into the electronic module, at least one measurement of the radial acceleration is made in order to determine the value T of the period of revolution of the wheel, the radial acceleration of the wheel is measured with a predetermined sampling period adapted to detect a variation of said radial acceleration representative of a position of the electronic module in contact with the ground, the position of the electronic module in which a variation of the radial acceleration is detected is determined in terms of a frame of reference based on a reference unit formed by an angular sector, called the unit sector Su, having a length at least substantially shorter than the mean length of the footprint Lfp of the tire on the ground, where the angular sector that contains the electronic module is determined as an origin sector So, and the angular positions of the electronic module (5) are determined in the frame of reference defined by the origin So and the unit sector Su.

This method therefore consists, on the one hand, in calculating the period of revolution T of said wheel based on the data supplied by a simple radial acceleration measurement sensor, and, on the other hand, in detecting an abrupt variation of radial acceleration representative of the positioning of the electronic module in contact with the ground, after which a frame of reference and a specific sampling period are defined and then used to determine the angular positions of said electronic module.

This method can be used advantageously, notably, for locating the wheels of a vehicle by commanding the transmission of signals in determined angular positions of the electronic modules. For this purpose, the frame of reference defined by the origin sector So and the unit sector Su is advantageously used for the determination of the angular positions of the electronic module in which the transmission of signals between said electronic module and a central unit on board the vehicle is commanded.

Another advantageous application of the method according to the invention consists in determining the length of the footprint Lfp of the tire on the ground.

For this purpose, the method according to the invention consists in carrying out, in the origin sector So, after at least one wheel revolution following the detection of said origin sector, a series of measurements with a sampling frequency adapted to allow the subsequent detection of a variation in radial acceleration corresponding to a falling edge followed by a variation in radial acceleration corresponding to a rising edge, and in deducing the length of the footprint Lfp from the distance between these two edges.

In an advantageous embodiment of the invention used for the purpose of detecting the origin sector So, the radial acceleration of the wheel is measured with a sampling period equal to T/x, in such a way that said origin point is the position of an origin sector So having the same length as the unit sector Su.

Additionally, and advantageously, according to the invention, in order to determine the period of revolution T, at least three successive measurements of radial acceleration are made, the measured values are compared so as to discard any measured value which is smaller than the other measured values by at least a predetermined threshold value, the mean value of the validated measured values is calculated, and the value T of the period of revolution of the wheel is determined on the basis of this mean value.

This procedure makes it possible to avoid aberrations due to a measured value of radial acceleration corresponding to a position of the electronic module in contact with the ground.

It should also be noted that, when a measurement is found to be smaller than the other measured values by at least a predetermined threshold value, this measurement must correspond to a position of the electronic module in which the module is in contact with the ground. Therefore, this preliminary phase of determination of the period of revolution T also leads directly, in this case, to the determination of the position of the origin sector So.

Additionally, according to this embodiment, the value T of the period of revolution of the wheel is advantageously determined on the basis of values of radial acceleration measured at time intervals which are at least substantially equal to 30 milliseconds.

This is because this time interval is found to ensure the reliability of the calculation of the value T of the period of revolution of the wheel over a very wide range of values of vehicle speed.

BRIEF DESCRIPTION OF THE DRAWINGS

Other characteristic objects and advantages of the invention will be made clear by the following detailed description with reference to the attached drawings which represent, by way of non-limiting example, a preferred embodiment of the method according to the invention. In these drawings:

FIG. 3 is a diagram showing the variations of radial acceleration measured by a measurement sensor using the method according to the invention, and FIG. 4 is a schematic view of a wheel, showing the angular sectors determined according to the method of the invention.

DETAILED DESCRIPTION OF THE PREFERRED EMBODIMENTS

The invention described below with reference to the attached drawings proposes a method for determining the angular position of an electronic module fixed to the inner face of the tire tread of a vehicle wheel.

Figure 1:
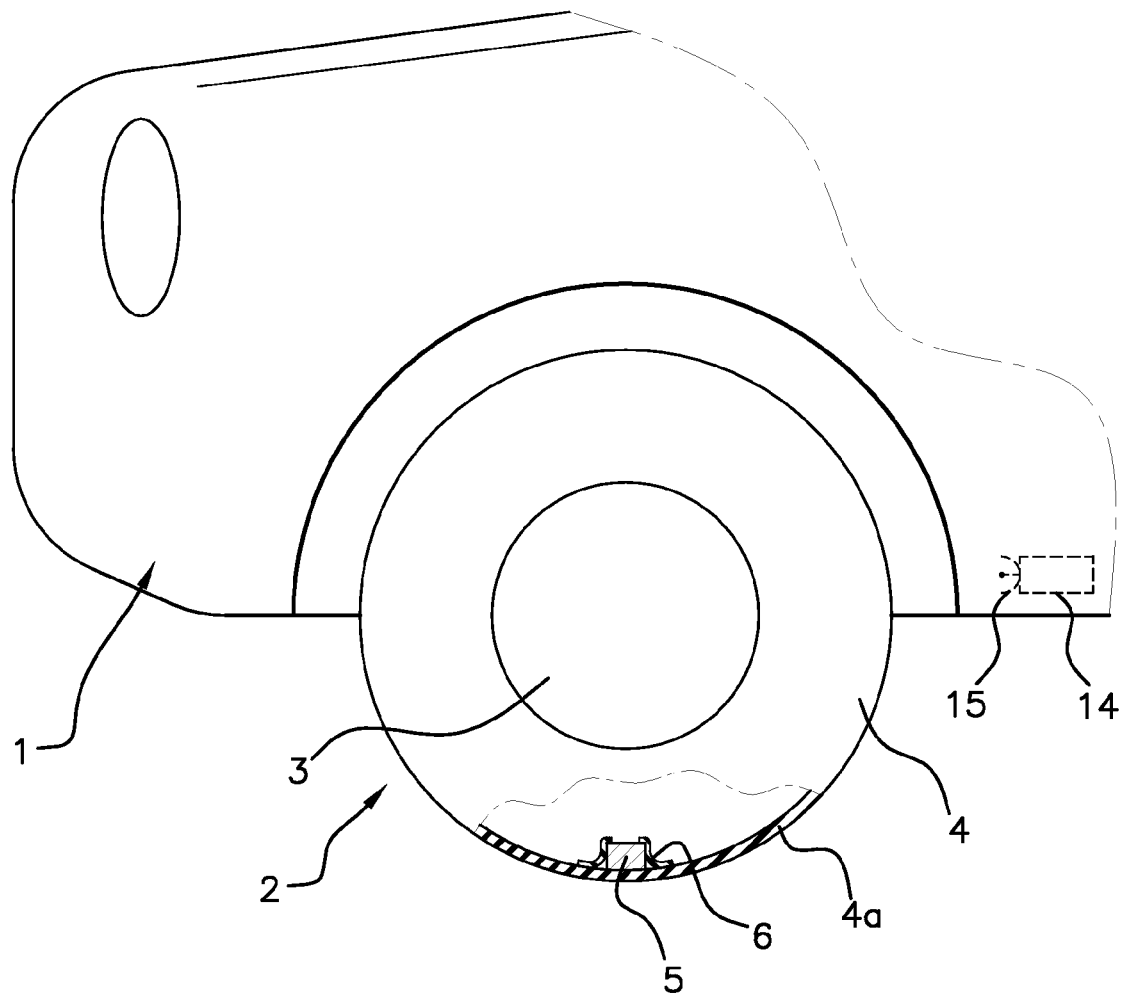
FIG. 1 is a schematic view of the front portion of a motor vehicle fitted with an electronic module for the application of the method according to the invention for determining the angular position of said electronic module.

For the application of the method, as shown in FIG. 1, the vehicle 1 has wheels such as that indicated by 2, each wheel being conventionally composed of a rim 3 fitted with a tire 4, and a system for monitoring parameters, such as pressure or temperature, of each tire 4, including, primarily, an electronic module 5 associated with each of the wheels 2.

As shown in FIG. 1, each of these electronic modules 5 is positioned on the inner face of the tread 4a of a tire 4. Additionally, in order to allow for servicing, the module is inserted into a flexible receptacle 6 bonded onto the tread 4a and made of a plastic material adapted to form a "pouch" of retentive shape in which the electronic module 5 is trapped.

Figure 2:
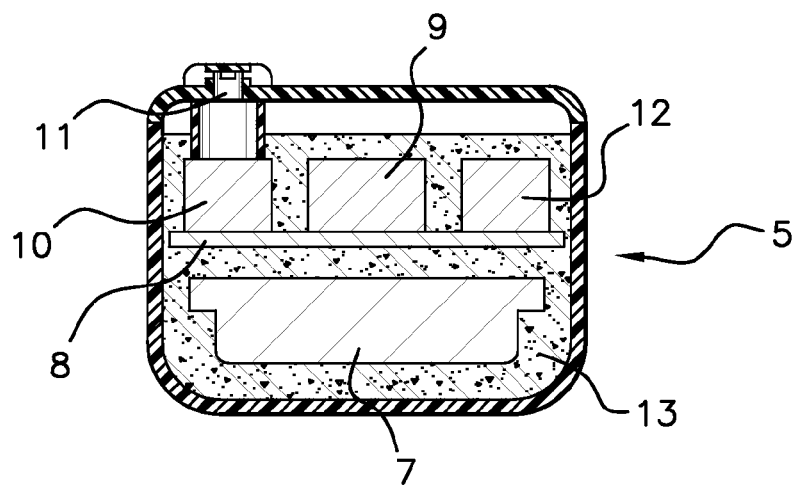
FIG. 2 is an enlarged sectional view of an electronic module for the application of the method according to the invention.

Additionally, as shown in FIG. 2, each electronic module 5 incorporates, notably, a battery 7 housed in the base of said module, and, above this battery 7, an electronic circuit card 8 to which are connected a microprocessor 9, linked to a radio frequency (RF) transmitter connected to an antenna, a pressure sensor 10 having a measurement chamber arranged so as to open opposite an opening 11 formed in the upper part of said module, and, according to the invention, a sensor 12 for measuring the radial acceleration of the wheel 2, this sensor being a microelectromechanical system (MEMS), a piezoelectric sensor, an impact sensor, or other sensor.

Additionally, this electronic module 5 is partially filled with a filling material 13 adapted to encase all the components.

The monitoring system also comprises (FIG. 1) a centralized computer or central unit 14, located on board the vehicle 1, having a microprocessor and incorporating a radio frequency (RF) receiver connected to an antenna 15 for receiving the signals transmitted by each of the electronic modules 5.

Usually, a monitoring system of this type, and notably its central unit 14, is designed so as to inform the driver of any abnormal change in the parameters measured by the sensors, such as 10, associated with the wheels 2.

According to the invention, this monitoring system can also be used to determine the angular position of the electronic module 5.

To this end, the method according to the invention consists, primarily, in:

a/ determining at least three values of radial acceleration measured at time intervals which are at least substantially equal to 30 milliseconds, b/ comparing the measured values and invalidating any measured value which is smaller than the other measured values by at least a predetermined threshold value (of the order of ten g, for example), c/ calculating the mean value of the validated measured values, and determining the value T of the period of revolution of the wheel 2 using this mean value, for example on the basis of the formula $T=2\pi\cdot\sqrt{R/Z}$, where R is the radius of the wheel 2 and Z is the radial acceleration of said wheel, d/ deducing from the period of revolution T a sampling period equal to T/20 (in the illustrated example), representative of the time required to travel through an angular sector corresponding to a mean length of the footprint Lfp of the tire 4 on the ground.

If no measured value has been invalidated (which is the most common case), the method according to the invention then consists in:

e/ measuring, with the sampling period equal to T/20, the radial acceleration of the wheel 2 so as to detect a variation of said radial acceleration which appears, as shown in FIG. 3, in the form of a rising or falling edge of the curve of measured values, and corresponds to the instant when the electronic module 5 is in contact with the ground, f/ assigning to the position of the angular sector in which the electronic module 5 is located, and in which a variation of the radial acceleration is detected, to be the origin sector So, based on a frame of reference defined by the location of the electronic module 5 and a reference unit formed by an angular sector Su, called the unit sector, that has length equal to the length covered during the time T/20, g/ and the angular positions of the electronic module 5 are determined in the frame of reference (So, Su) defined by the origin So and the unit sector Su.

On the other hand, if one of the values measured for the determination of the period of revolution T is invalidated in step b/, the method according to the invention consists, directly after step d/, in carrying out a step f1/, in which the position of the angular sector in which the electronic module 5 is located, and in which the invalidated measurement has been made, is assigned to be the origin sector So.

In both cases described above, the method according to the invention results in the creation of a frame of reference (So, Su) for the determination of the angular position of the electronic module 5, making it possible to determine the position of the angular sector in which said electronic module is located, for example in order to apply a method of locating the wheels 2 of the vehicle 1 using a correlation method in which the transmissions of signals by each electronic module 5 towards the central unit 14 can be triggered for the origin sector So and/or for one or more other completely determined angular positions of this electronic module 5.

Another application consists in determining the length of the footprint Lfp of the tire 4 on the ground. For this purpose, the method according to the invention consists in carrying out, in the origin sector So, after at least one revolution of the wheel 2 following the detection of said origin sector, a series of measurements with a higher sampling frequency, of the order of several tens of microseconds for example, adapted to allow the subsequent detection of a variation in radial acceleration corresponding to a falling edge followed by a variation in radial acceleration corresponding to a rising edge, and in deducing, from the time between these two edges, the length of the footprint Lfp of the tire 4 on the ground.

The method according to the invention can therefore be used to determine the angular position of an electronic module 5 fixed to the inner face of the tread 4a of a tire 4, based solely on the data supplied by a sensor for measuring the radial acceleration of the wheel 2 fitted with this tire 4.

The invention claimed is:

1. A method for determining, during rotation of a wheel (2) of a vehicle (1) fitted with a tire (4), an angular position of an electronic module (5) fixed to an inner face of the tread (4a) of said tire, comprising:
  integrating a sensor (12) that measures a radial acceleration of the wheel (2) into the electronic module (5);
  making, by way of the sensor, at least one measurement of the radial acceleration, and using a value based on the at least one measurement to determine a value of a period (T) of revolution of the wheel (2);
  after the determining of the period (T) of revolution of the wheel (2), determining a sampling period by dividing the period (T) of revolution of the wheel (2) by a predetermined sampling rate (x), performing a plurality of measurements of the radial acceleration of the wheel (2) according to the determined sampling period, and
  detecting a variation of the plurality of measurements, the variation representative of a position of the electronic module (5) when a portion of the tire (4), upon which the electronic module (5) is affixed, is being in contact with the ground;
  determining the position of the electronic module (5) to be a location on the tire in which the variation of the radial acceleration is detected, and defining an origin sector (So) in terms of the determined position of the electronic module (5) on the tire when the tire is in contact with the ground and a reference unit of the tire formed by an angular unit sector (Su), the angular unit sector (Su) having a length that is shorter than a mean length of a footprint (Lfp) of the tire (4) on the ground, the footprint determined as a length between a falling edge and rising edge of the tire, the falling edge and rising edge determined by the variation of the radial acceleration detected from the electronic module (5) taking place when the portion of the tire upon which the electronic module (5) is affixed is in direct contact with the ground; and
  determining angular positions of the electronic module (5) inside a frame of reference defined by the origin sector (So), wherein the length of the origin sector ($S_o$) is the same length as the angular unit sector ($S_u$), and the length of the angular unit sector ($S_u$) is equal to the length rotated by the wheel (2) during the sampling period.

2. The method according to claim 1, wherein the predetermined sampling rate (x) is equal to 20.

3. The method according to claim 2, wherein the frame of reference is used for the determination of the angular positions of the electronic module (5), in which the transmission of signals between said electronic module and a central unit (14) on board the vehicle (1) is commanded.

4. The method according to claim 2, wherein, the making at least one measurement of the radial acceleration by the sensor (12) and determining the period (T) of revolution of the wheel (2) comprises the sub-steps of,
  making at least three successive measurements of the radial acceleration,
  comparing the at least three successive measurements and discarding any of the at least three successive measurements which is smaller than any other of the at least three successive measurements and discarding by at least a predetermined threshold value,
  calculating a mean value of all non-discarded ones of the at least three successive measurements, and using said mean value to determine the value of the period (T) of revolution of the wheel (2).

5. The method according to claim 1, wherein the frame of reference is used for the determination of the angular positions of the electronic module (5), in which the transmission of signals between said electronic module and a central unit (14) on board the vehicle (1) is commanded.

6. The method according to claim 5, wherein, the making at least one measurement of the radial acceleration by the sensor (12) and determining the period (T) of revolution of the wheel (2) comprises the sub-steps of,
  making at least three successive measurements of the radial acceleration,
  comparing the at least three successive measurements and discarding any of the at least three successive measurements which is smaller than any other of the at least three successive measurements and discarding by at least a predetermined threshold value,
  calculating a mean value of all non-discarded ones of the at least three successive measurements, and using said mean value to determine the value of the period (T) of revolution of the wheel (2).

7. The method according to claim 1, wherein, the making at least one measurement of the radial acceleration by the sensor (12) and determining the period (T) of revolution of the wheel (2) comprises the sub-steps of, made at least three successive measurements of the radial acceleration, comparing the at least three successive measurements and discarding any of the at least three successive measurements which is smaller than any other of the at least three successive measurements and discarding by at least a predetermined threshold value, calculating a mean value of all non-discarded ones of the at least three successive measurements, and using said mean value to determine the value of the period (T) of revolution of the wheel (2).

8. The method according to claim 7, wherein the value of the period (T) of revolution of the wheel (2) is determined on the basis of values of radial acceleration measured at time intervals which are substantially equal to 30 milliseconds.

9. A method for determining, during rotation of a wheel (2) of a vehicle (1) fitted with a tire (4), an angular position of an electronic module (5), including a radial acceleration sensor (12) that measures a radial acceleration of the wheel (2), fixed to an inner face of the tread (4a) of the tire, comprising:

making, by way of the radial acceleration sensor, three or more measurements of the radial acceleration, calculating a mean value of the three or more measurements, and using the calculated mean value of the three or more measurements to determine a value of a period (T) of revolution of the wheel (2);

after the determining of the period (T), determining a sampling period by dividing the period (T) of revolution of the wheel (2) by a predetermined sampling rate (x), performing a plurality of measurements of the radial acceleration of the wheel (2) according to the sampling period, and detecting a variation of the plurality of measurements, the variation representative of a position of the electronic module (5) when a portion of the tire (4), upon which the electronic module (5) is affixed, is in contact with the ground;

determining the position of the electronic module (5) to be a location on the tire in which the variation of the radial acceleration is detected, and defining an origin sector (So) in terms of the determined position of the electronic module (5) on the tire when in contact with the ground and a reference unit of the tire formed by an angular unit sector (Su), the angular unit sector (Su) having a length that is shorter than a mean length of a footprint (Lfp) of the tire (4) on the ground determined as a length between a falling edge and rising edge of the tire, the falling edge and rising edge determined by the variation of the radial acceleration detected from the electronic module (5); and determining angular positions of the electronic module (5) inside a frame of reference defined by the origin sector (So), wherein the length of the origin sector ($S_o$) is the same length as the angular unit sector ($S_u$), and the length of the angular unit sector ($S_u$) is equal to the length rotated by the wheel (2) during the sampling period.

10. The method according to claim 9, wherein the mean value of the three or more measurements of the radial acceleration is used to determine the value of the period (T) of revolution of the wheel (2) by way of the formula:

$$T=2\pi\sqrt{R/Z}$$

where R is the radius of the wheel, and Z is the mean value of the three or more measurements.

11. The method according to claim 9, wherein the three or more measurements are compared with each other, and any one of the three or more measurements that is smaller than a remainder of the three or more measurements by a predetermined threshold value is invalidated so as not to be used in the calculating of the mean value.

12. The method according to claim 9, wherein the three or more measurements are obtained at a rate of one measurement per 30 milliseconds.

* * * * *